United States Patent [19]

Beaumont et al.

[11] Patent Number: 4,749,919
[45] Date of Patent: Jun. 7, 1988

[54] SHUTDOWN CIRCUIT FOR VIDEO MONITOR

[75] Inventors: Gregory J. Beaumont, Arlington Heights; James R. Oates, Wheeling; Richard J. Steinmetz, Elk Grove Village, all of Ill.

[73] Assignee: Zenith Electronics Corporation, Glenview, Ill.

[21] Appl. No.: 720,065

[22] Filed: Apr. 8, 1985

Related U.S. Application Data

[63] Continuation of Ser. No. 376,452, May 10, 1982, abandoned.

[51] Int. Cl.$^4$ .................. H01J 29/52; H04N 5/68
[52] U.S. Cl. .................. 315/386; 315/383; 358/243
[58] Field of Search .......... 315/381, 383, 384–386; 358/243

[56] References Cited

U.S. PATENT DOCUMENTS

| | | | |
|---|---|---|---|
| 3,795,767 | 3/1974 | Waltner et al. | 178/7.5 R |
| 4,082,986 | 4/1978 | Gamboa | 315/411 |
| 4,090,111 | 5/1978 | Suzuki | 358/243 |
| 4,126,816 | 11/1978 | Willis | 315/411 |
| 4,213,166 | 7/1980 | Watanabe | 361/86 |
| 4,287,535 | 9/1981 | Vakil | 358/243 |

Primary Examiner—Theodore M. Blum
Assistant Examiner—Gregory C. Issing

[57] ABSTRACT

In a horizontal drive circuit for a video display, means are provided for sensing the horizontal output pulse used to energize the high voltage sweep transformer and, in turn, the electrodes and deflection coils in a cathode ray tube (CRT). Horizontal output pulse height which represents not only the voltage applied to the CRT, but also retrace pulse duration is detected and utilized to terminate the video output when the horizontal pulse voltage level exceeds a predetermined value. Because this approach uses the collector pulse output of the horizontal output transistor to detect high voltage conditions, video shutdown during unsafe CRT operation is available not only for excessive peak voltage conditions, but also for improper retrace time operation due, for example, to sweep transformer malfunction.

1 Claim, 1 Drawing Sheet

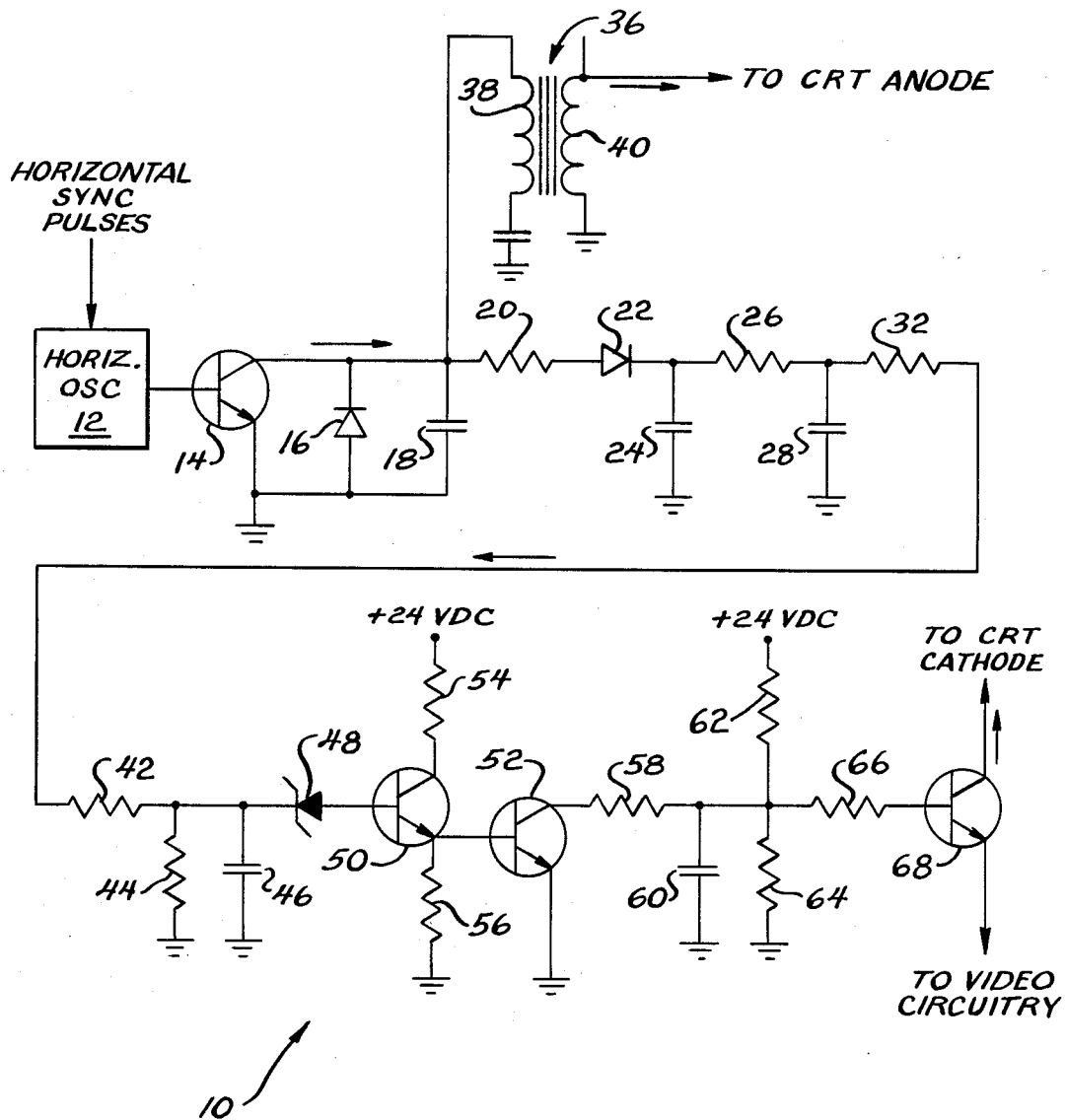

SHUTDOWN CIRCUIT FOR VIDEO MONITOR

This application is a continuation of application Ser. No. 376,452, filed May 10, 1982, abandoned.

BACKGROUND OF THE INVENTION

This invention relates generally to cathode ray tube (CRT) control systems and is more specifically directed to a shutdown circuit for a CRT responsive to the voltage level applied thereto to prevent the emission of hazardous X-radiation levels from the CRT.

In general, a video display utilizing a CRT includes a low voltage power supply for driving electron beam scanning circuitry and a high voltage power supply for energizing the accelerating grids of the CRT. The CRT's electron beam current is controlled by the relative potentials on the cathode and control grid electrodes with the cathode being coupled directly to the video output signal. The various electrode grids in the CRT perform functions such as brightness control, picture focusing and contrast and background selection as determined by the voltage applied to a particular electrode grid.

Typically, the ultor, or anode, high voltage accelerating potential for electron beam current is derived from a voltage developed across a winding of a horizontal output transformer in the video monitor. In transistorized deflection circuits, the high voltage is a function of such factors as the regulated B+operating voltage, component values of the resonant retrace circuit, and the internal impedance of the output transformer. The high voltage value will vary as beam current is being drawn by the CRT, the high voltage increasing relatively sharply for beam current decrements at low beam current levels.

Two operating parameters, the electron accelerating potential and the electron beam current, are particularly important in establishing CRT performance levels. For example, CRT viewing screen brightness is determined primarily by electron beam current intensity. In general, optimum video display performance requires operating at the highest possible electron accelerating potential and electron beam current.

Energetic electrons striking the face plate of the CRT produce X-radiation, thus imposing a limitation on video monitor operation and presenting a potential health hazard. If the video monitor is operated at an electron accelerating potential or an electron beam current higher for than that for which it was designed, the X-radiation emitted by the CRT may exceed a predetermined maximum safe level. Operation of the video monitor at a voltage higher than that for which it was designed may be due to any one of a variety of factors such as a transient high voltage surge, a faulty high voltage regulating component, or an improper video monitor voltage setting. Whatever the source, this overvoltage situation is made even more dangerous because of the difficulty in detecting it. Indeed, even with a dangerous increase in operating voltage, the video monitor may continue to operate satisfactorily or even with an improvement in performance due to enhanced video presentation brightness.

Various approaches have been adopted in attempting to optimize CRT operation in the video monitor while regulating electron accelerating voltage and beam current so as to conform with safety requirements generally represented by an "Isodose" curve. An "Isodose" curve represents a safe combination of high voltage and beam current so as not to produce hazardous X-radiation. The maximum safe X-radiation level recognized for a video monitor in accordance with federal regulations is 5 millirem/hour, which is represented by an aforementioned "Isodose" curve for a given CRT. The area above the "Isodose" curve represents excessive X-radiation levels while the area below the curve is within generally acceptable safety limits.

The approach generally taken for maximizing electron beam current and high voltage within safe operating levels in a CRT involves the monitoring of a signal representing one of these operating parameters in a feedback arrangement for providing a shutdown signal when a safe operating limit is exceeded. The prior art discloses many such approaches such as U.S. Pat. Nos. 4,126,816 to Willis (the voltage in a secondary winding of the horizontal output transformer is sensed), 4,213,166 to Watanabe (the voltage in a tertiary winding of the horizontal fly-back transformer is sensed), 4,287,535 to Vakil (detection of excessive current on a tertiary winding of the high voltage sweep transformer in generating a shutdown feedback signal), and 4,082,986 to Gamboa (horizontal retrace pulse width is monitored and compared with a standard pulse width). Finally, U.S. Pat. No. 3,795,767 to Waltner et al discloses a high voltage protection circuit for a television receiver in which the B boost voltage, which is a horizontally derived B+voltage generated by horizontal drive circuitry and which allegedly tracks the ultor (anode) high voltage, activates a neon light switch for grounding the video output when the ultor voltage exceeds a predetermined limit. It is alleged that, since the B boost voltage tracks the ultor potential, the B boost voltage may be used to indicate excessive ultor voltage for shutting down CRT operation. This analysis is incorrect, since the high voltage applied across the CRT may increase substantially due to any number of abnormal operating conditions, such as failure of a component in the damper circuitry, failure of a deflection yoke component, or improper horizontal deflection pulse width regulation, while failing to produce a corresponding increase in the B boost voltage.

The present invention is intended to overcome these and other limitations of high voltage shutdown systems used in prior art video monitors. The present invention does not rely upon an output which indirectly reflects the high voltage value, but rather senses the original high voltage input which drives the high voltage sweep transformer in more accurately monitoring and feeding back a signal reflecting the voltage applied across the CRT.

OBJECTS OF THE INVENTION

Accordingly, it is an object of the present invention to provide an improved shutdown system for a video monitor for terminating CRT operation when unsafe operating conditions exist.

It is another object of the present invention to provide a high voltage shutdown system for the CRT of a video monitor which is responsive not only to voltage level but also to CRT retrace time.

Still another object of the present invention is to provide an improved shutdown system for the CRT of a video monitor which operates independent of sweep transformer operating conditions.

A further object of the present invention is to provide a high voltage shutdown system for the CRT of a video monitor which is responsive directly to the input voltage pulse applied thereto and not to an output of the high voltage sweep transformer which is energized by the input voltage pulse.

BRIEF DESCRIPTION OF THE DRAWING

The appended claims set forth those novel features believed characteristic of the invention. However, the invention itself as well as further objects and advantages thereof will best be understood by reference to the following detailed description of a preferred embodiment taken in conjunction with the accompanying drawing which is a schematic diagram of a shutdown circuit for the CRT of a video monitor in accordance with the preferred embodiment of the present invention.

DESCRIPTION OF THE PREFERRED EMBODIMENT

Referring to the FIGURE, there is shown a shutdown circuit for a video monitor 10 in accordance with the present invention.

A horizontal drive signal, or synchronization pulse, is provided to a horizontal oscillator 12. The horizontal sync pulses are provided to the horizontal oscillator 12 by means of a sync separator (not shown) in the video signal processing circuitry which generates respective vertical and horizontal scanning rate sync signals for correlating CRT raster scan with the video synchronization signals, whether received from a broadcast station in the case of a television receiver or generated within the video monitor as in the case of a computer terminal. The horizontal oscillator 12 provides an output drive signal to the base of a horizontal output transistor 14 for driving it in synchronism with the input synchronization signals. With the horizontal output transistor 14 operating in synchronism with the video sync signals, the presentation of video information on the CRT (not shown) of the video monitor will be in proper time sequence with the raster scan of the CRT's electron beam. Typically, the horizontal oscillator 12 may be comprised of a combination of monostable and astable multivibrators (not shown) in providing an output signal for synchronization and phasing of the horizontal output transistor 14 with the synchronization input signal.

With the NPN horizontal output transistor 14 on during trace time and off during retrace time, a pulse waveform is generated on its collector with a pulse width of positive voltage typically 8 to 9 microseconds in duration and of approximately 800 peak volts. During the remainder of the operating cycle, a damper diode 16 and retrace capacitor 18 supply a voltage to the collector of the horizontal output transistor 14 which is approximately at ground (1 to 2 volts). Thus, the retrace capacitor 18 limits the peak voltage seen by the horizontal output transistor 14 when this transistor turns off so that its collector rating is not exceeded. In addition, capacitor 18 together with the reflected capacitance of the high voltage sweep transformer 36, the electron beam deflection yoke (not shown), the lin (linearity) coil (not shown) inductance, the width coil (not shown) and the primary winding 38 of the high voltage sweep transformer 36 create the retrace time. The retrace time determines the magnitude of the voltage developed on the horizontal output transistor 14.

The peak output of the horizontal output transistor 11 is then detected by means of resistor 20, diode 22 and grounded capacitor 21, and a DC voltage of approximately 800 VDC is developed. Integration and filtering of the DC voltage detected from the collector pulse of the horizontal output transistor 11 is accomplished by means of resistor 26 and grounded capacitor 28. The collector pulse is connected directly to the primary winding 38 of a high voltage sweep transformer 36 which generates the "high voltage" on its secondary winding 40.

The high voltage sweep, or fly-back, transformer 36 has a primary winding 38, and a secondary high voltage winding 40. Horizontal fly-back pulses provided to the primary winding 38 of the high voltage sweep transformer are boosted by the high voltage winding 40 and converted into a DC high voltage which in turn is applied to the anode of a cathode ray tube (not shown). The high voltage applied to the CRT's anode accelerates the electrons emitted by the CRT's cathode (not shown).

The DC voltage peak detected and filtered from the collector output from the horizontal output transistor 14 is also provided to series resistors 32, 42 which in combination with grounded resistor 44 form a voltage divider network for reducing the voltage applied to the anode of Zener diode 48. Grounded capacitor 46 reduces unwanted signal noise. Thus, the derived DC voltage is divided down and filtered by means of the aforementioned components and then applied across Zener diode 48.

The cathode of Zener diode 48 is coupled to the base of NPN transistor 50. NPN transistors 50, 52 form a Darlington pair to which a +24 VDC source is applied. The emitter of transistor 50 is coupled to ground by resistor 56, which is optional in the preferred embodiment of the invention. Resistor 54 couples the +24 VDC source to the collector of transistor 50 for current limiting purposes, while resistor 58 coupled to the collector of transistor 52 also performs a current limiting function. The Darlington pair comprised of transistors 50, 52 acts as a switch in the following manner. When the voltage applied to the anode of Zener diode 48 exceeds the Zener diode breakdown voltage plus $2V_{BE}$ from transistors 50, 52, Zener diode 48 is rendered conducting via transistors 50, 52 with current flowing from Zener diode 48 and the +24 VDC source through the collector of transistor 50 to the base of transistor 52 to ground. Thus, the Darlington pair of transistors 50, 52 acts as a switch in response to the magnitude of the voltage applied to the anode of Zener diode 48.

The collector of transistor 52 is coupled to the base of the NPN video output transistor 68 via resistors 58, 66. When the pair of transistors 50, 52 is rendered conducting in the manner previously detailed, the base of NPN transistor 68 is clamped to approximately neutral ground potential resulting in the complete turn off of the video output transistor 68. Under normal operating conditions, with diode 48 and the video disable circuit comprised of transistors 50, 52 in a nonconducting state, a +24 VDC source is applied via resistors 62, 66 to the base of the video output transistor 68 for the operation thereof. When the transistors 50, 52 of the video disable circuit are rendered conducting by the turn-on of Zener diode 48, the +24 VDC source is grounded via resistors 62, 58 and conducting NPN transistor 52. Similarly, the base of the video output transistor 68 is grounded via resistors 66, 58 and conducting transistor 52, thus rendering the video output transistor 68 in an OFF state. Thus, with transistors 50, 52 conducting, video output transistor 68 is in an OFF state and no output is provided from the video output transistor 68 to the CRT's cathode. The electron beam is thus terminated and the potential harm from excess X-radiation emanating from the CRT of the video monitor is avoided. Under normal operating conditions, resistor 58 and grounded capacitor 60 form a filtering network, while resistors 62, 64 divide the +24 VDC down to a lower voltage for application to the base of video output transistor 68. Resistor 66 performs a current limiting function with respect to the base of the video output transistor 68. Similarly, the emitter of video output transistor 68 is coupled to a video driver transistor (not shown) which is rendered nonconducting when the video output transistor 68 is OFF.

In a practical example of the present invention, the following values are assigned to various components of the shutdown circuit for a video monitor to provide the previously discussed shutdown feature for enhanced viewer safety:

| Reference No. | Preferred Value |
| --- | --- |
| 18 | 0.0039 Microfarads |
| 20 | 3.6 Kilohms |
| 24 | 0.001 Microfarads |
| 26 | 470 Kilohms |
| 28 | 0.001 Microfarads |
| 32 | 1.2 Megohms |
| 42 | 1 Megohm |
| 44 | 51 Kilohms |
| 46 | 1000 Picofarads |
| 54 | 120 Kilohms |
| 56 | 120 Kilohms |
| 58 | 4.7 Ohms |
| 60 | 10 Microfarads |
| 62 | 2.7 Kilohms |
| 64 | 1.5 Kilohms |
| 66 | 47 Ohms |

There has thus been described a shut-down circuit for the CRT of a video monitor which is responsive to the energy applied to a high voltage sweep transformer therein, rather than to an output of this transformer, for shutting down the CRT's electron beam in avoiding excess X-radiation produced by an excessively high electron beam current or voltage applied across the various electrodes of the CRT.

While particular embodiments of the present invention have been shown and described, it will be apparent to those skilled in the art that changes and modifications may be made therein without departing from the invention in its broader aspects. The aim in the appended claims, therefore, is to cover all such changes and modifications as fall within the true spirit and scope of the invention.

We claim:

1. In a video display system including a cathode ray tube having an anode and a cathode, said video display system further including a direct voltage source for energizing said cathode and a high voltage output transformer having a primary and a secondary winding, wherein said high voltage output transformer is energized by a source of periodically recurring input voltage pulses for energizing said anode for initiating and sustaining electron beam current in said cathode ray tube, a high voltage shutdown circuit comprising:

voltage sensing means directly coupled to the primary winding of the high voltage output transformer and to said source of periodically recurring input voltage pulses for comparing the peak voltage level of the pulses provided to said high voltage output transformer with a predetermined voltage with said voltage sensing means rendered conducting when the peak voltage level of said input pulses is greater than said predetermined voltage, wherein the peak voltage level of the pulses provided to said high voltage output transformer accurately corresponds to a maximum voltage applied to said anode from the high voltage output transformer;

video disable means coupled to said direct voltage source and to said voltage sensing means wherein said video disable means is rendered conducting in response to the conduction of said voltage sensing means for grounding said direct voltage source in removing the energizing voltage from said cathode for terminating said electron beam current when the voltage of said periodically recurring input pulses exceeds said predetermined voltage; and video output means coupling said direct voltage source and said cathode and connected to said video disable means wherein current in said video output means is directed to neutral ground potential when said video disable means is rendered conducting, said video output means including an NPN transistor having a base coupled to said direct voltage source and to said video disable means and a collector coupled to said cathode.

* * * * *